(12) United States Patent
Liu

(10) Patent No.: US 7,986,119 B2
(45) Date of Patent: Jul. 26, 2011

(54) MOTOR CONTROL SYSTEM

(75) Inventor: Hsing-Chang Liu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 324 days.

(21) Appl. No.: 12/241,021

(22) Filed: Sep. 29, 2008

(65) Prior Publication Data
US 2009/0322274 A1 Dec. 31, 2009

(30) Foreign Application Priority Data

Jun. 30, 2008 (CN) .......................... 2008 1 0302464

(51) Int. Cl.
G05B 19/18 (2006.01)
G05B 15/00 (2006.01)
(52) U.S. Cl. ............. 318/569; 318/600; 700/83; 700/17
(58) Field of Classification Search .................. 318/560, 318/561, 567, 569, 600; 700/17, 83, 180, 700/1, 90
See application file for complete search history.

(56) References Cited

U.S. PATENT DOCUMENTS

| | | | | |
|---|---|---|---|---|
| 4,570,217 | A | * | 2/1986 | Allen et al. ...................... 700/83 |
| 5,453,933 | A | * | 9/1995 | Wright et al. .................. 700/181 |
| 5,691,898 | A | * | 11/1997 | Rosenberg et al. ............. 700/85 |
| 6,922,611 | B2 | * | 7/2005 | Lapham .......................... 700/245 |
| 6,946,812 | B1 | * | 9/2005 | Martin et al. .................. 318/567 |

\* cited by examiner

*Primary Examiner* — Eduardo Colon-Santana
(74) *Attorney, Agent, or Firm* — Zhigang Ma

(57) ABSTRACT

A motor control system includes an MMI (man machine interface), an upper-controller, and a motor driver connected in that order. The upper-controller includes a motherboard, a communication control module, and a servo driven control card connected in that order. The motherboard is connected to the MMI and includes a processor. The communication control module includes a plurality of control cards. A control signal is inputted into the MMI and sequentially processed by the processor, the communication control module, and the servo driven control card. A driven signal is outputted from the servo driven control card to the motor driver to drive a motor.

5 Claims, 4 Drawing Sheets

MOTOR CONTROL SYSTEM

BACKGROUND

1. Field of the Invention

The present disclosure relates to control systems, and particularly to a motor control system.

2. Description of Related Art

Referring to FIG. 2, a conventional personal computer based (PC-BASED) movement control system 10 includes a man machine interface (MMI) 101, a PC-BASED controller 110, and a motor driver 120 for driving a motor 130 connected in that order. The PC-BASED controller 110 includes a motherboard 111, a digital input/output (I/O) control card 112, an analog input/output (I/O) control card 113, a temperature card 114, and a movement card 115.

Referring to FIG. 3, a conventional programmable logic controller (PLC) movement control system 20 includes an MMI 201, a PLC 210, and a motor driver 220 for driving a motor 230 connected in that order. The PLC 210 includes a PLC host 211, a plurality of digital I/O control cards 212, an analog I/O control card 213, a temperature card 214, and a movement card 215.

Referring to FIG. 4, a conventional serial movement control system 30 includes an MMI 301, a special controller 310, and a motor driver 320 for driving a motor 330 connected in that order. The special controller 310 includes a PLC host 311, a plurality of digital I/O control cards 312, an analog I/O control card 313, a temperature card 314, and a serial movement card 311.

The motor drivers 120, 220, and 320 include direct current (DC) control circuits 121, 221, 321 and power drivers 122, 222, 322, respectively. The power drivers 122, 222, 322 are configured for sending control signals to the corresponding motors 130, 230, and 330 for controlling a movement status of the motors 130, 230, and 330. An encoder is installed in each of the motors 130, 230, and 330 for detecting a motor speed signal and returning the speed signal to each of the DC control circuits 121, 221, 321, and for controlling the movement status of the motors 130, 230, and 330.

However, in the conventional PC-BASED movement control system 10, the PLC movement control system 20, and the serial movement control system 30 include many control cards, such as a movement card, a serial movement card, and a driver DC control circuits, which are complicated and expensive. Additionally, these many control cards may have different serial communication protocols which may not be compatible with each other.

What is desired, therefore, is to provide a motor control system which can solve the above problems.

DETAILED DESCRIPTION

Figure 1:
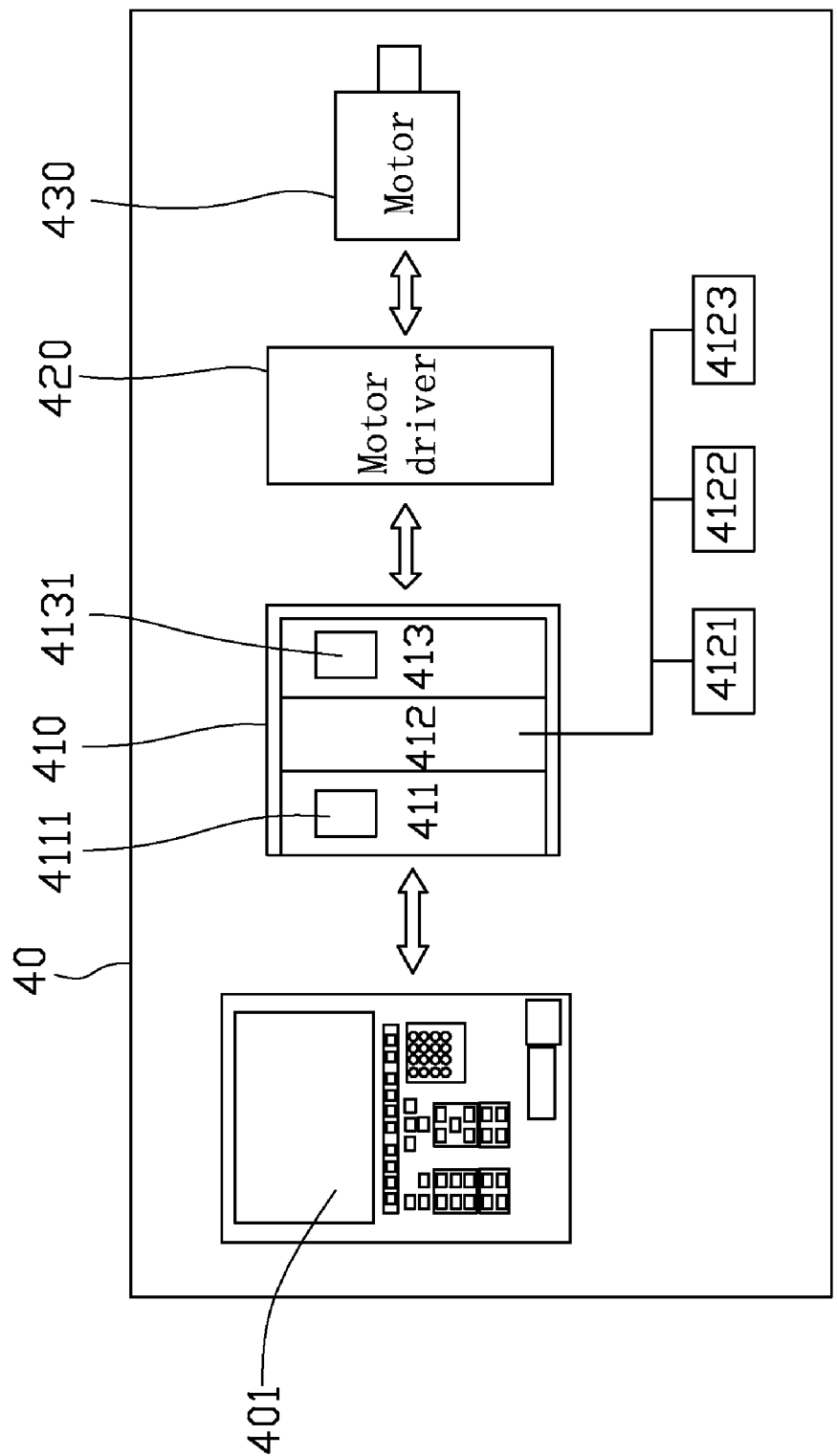
FIG. 1 is a schematic diagram of one embodiment of a motor control system of the present disclosure.

Referring to FIG. 1, one embodiment of motor control system 40 of the present disclosure includes a man machine interface (MMI) 401, a PC-BASED upper-controller 410, and a motor driver 420 for driving a motor 430 connected in that order.

The MMI 401 includes an operating system configured for processing graphics signals.

The PC-BASED upper-controller 410 includes a motherboard 411, a communication control module 412, and a servo driven control card 413.

The motherboard 411 includes a processor 4111 and a plurality of input/output (I/O) interfaces (not shown). A control signal is inputted into the MMI 401 and sequentially processed by the processor 4111, the communication control module 412, and the servo driven control card 413. A driven signal is outputted from the servo driven control card 413 to the motor driver 420 to drive the motor 430. The processor 4111 is connected to the motherboard 411 via the I/O interface.

The communication control module 412 includes a plurality of digital I/O control cards 4121, an analog I/O control card 4122, and a temperature control card 4123. The communication control module 412 is a general I/O control module. The communication control module 412 is connected to the motherboard 411 via the I/O interface of the motherboard 411 for converting signals from the motherboard 411 to digital signals or analog signals.

The servo driven control card 413 is connected to the motherboard 411 via the I/O interface of the motherboard 411 for receiving the analog signals or digital signals from the communication control module 412. The functions of the movement cards 115 of FIG. 1 and 215 of FIG. 2, serial movement card 315 of FIG. 3, and DC control circuits 121, 221, and 321 are integrated into the servo driven control card 413. The servo driven control card 413 includes a digital signal processor (DSP) 4131. The DSP 4131 communicates with the motherboard 411 via a bus.

The function of the driver 420 is the same as the function of the conventional driver except that the driver 420 does not need a direct current (DC) power source. The driver 420 includes a control circuit for driving the motor 430.

A speed detector (not shown) is set in an output terminal of the motor 430 for detecting speed signals of the motor 430 and returning the speed signals to the servo driven control card 413.

Figure 2:
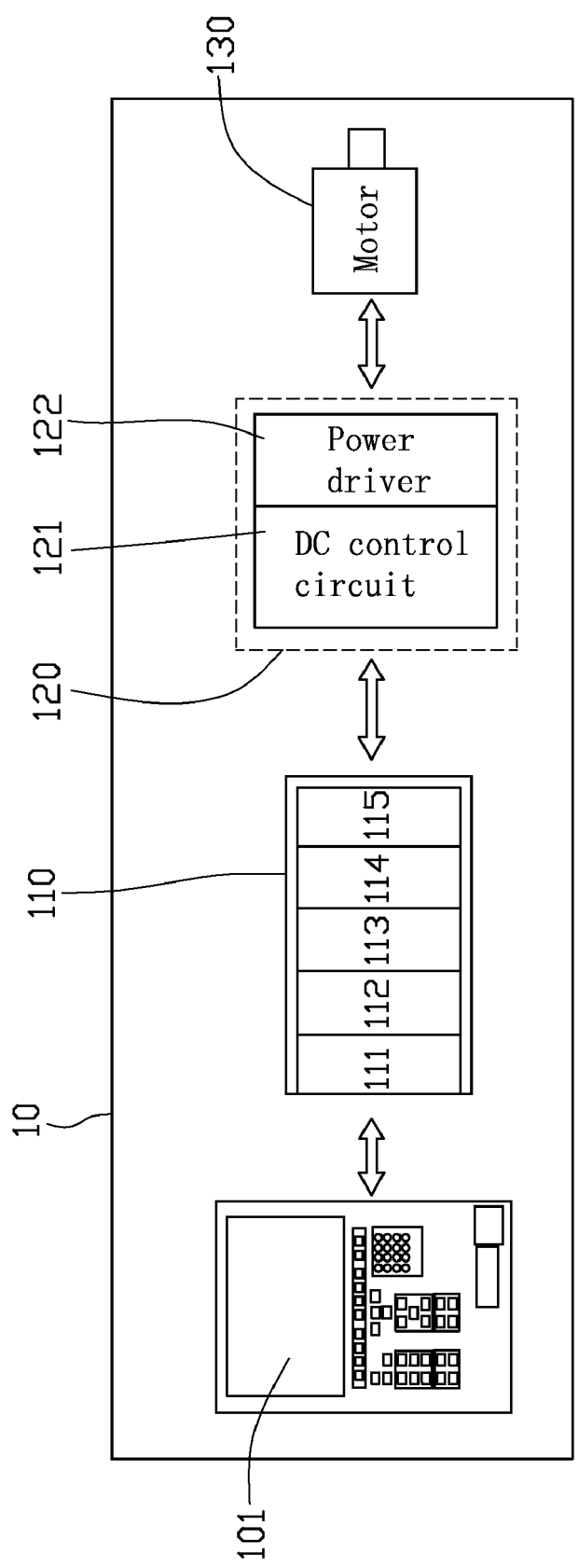
FIG. 2 is a schematic diagram of a conventional PC-BASED movement control system.
Figure 3:
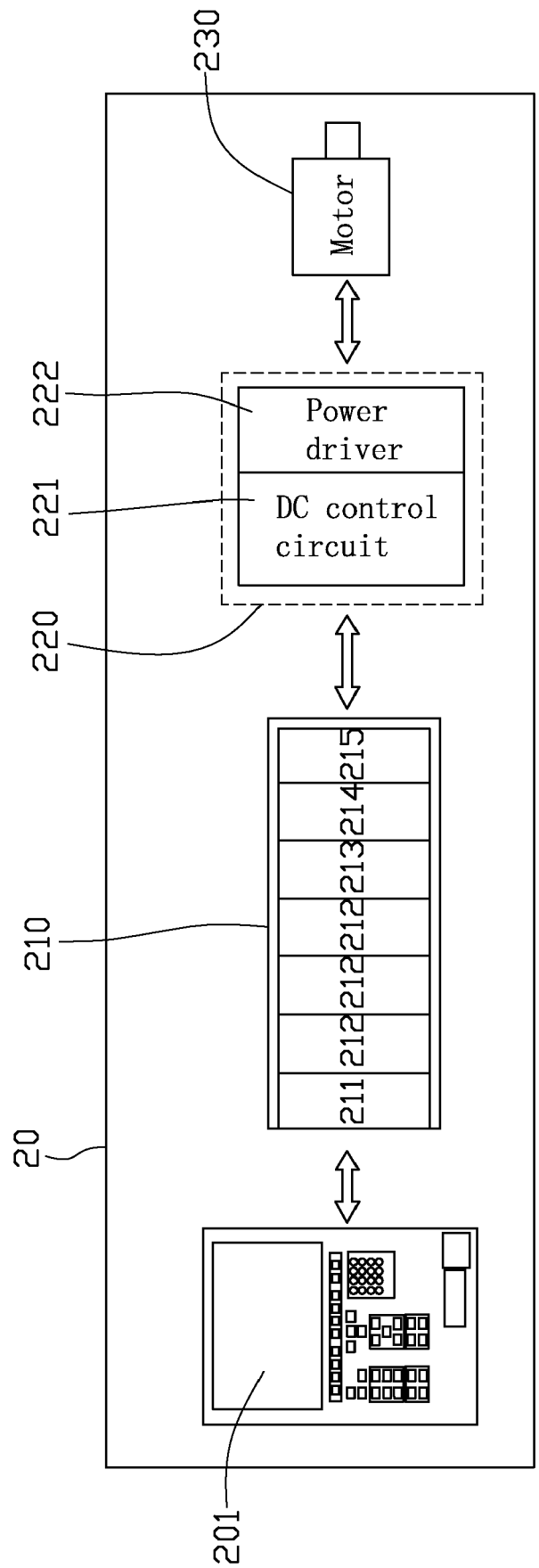
FIG. 3 is a schematic diagram of a conventional PLC movement control system.
Figure 4:
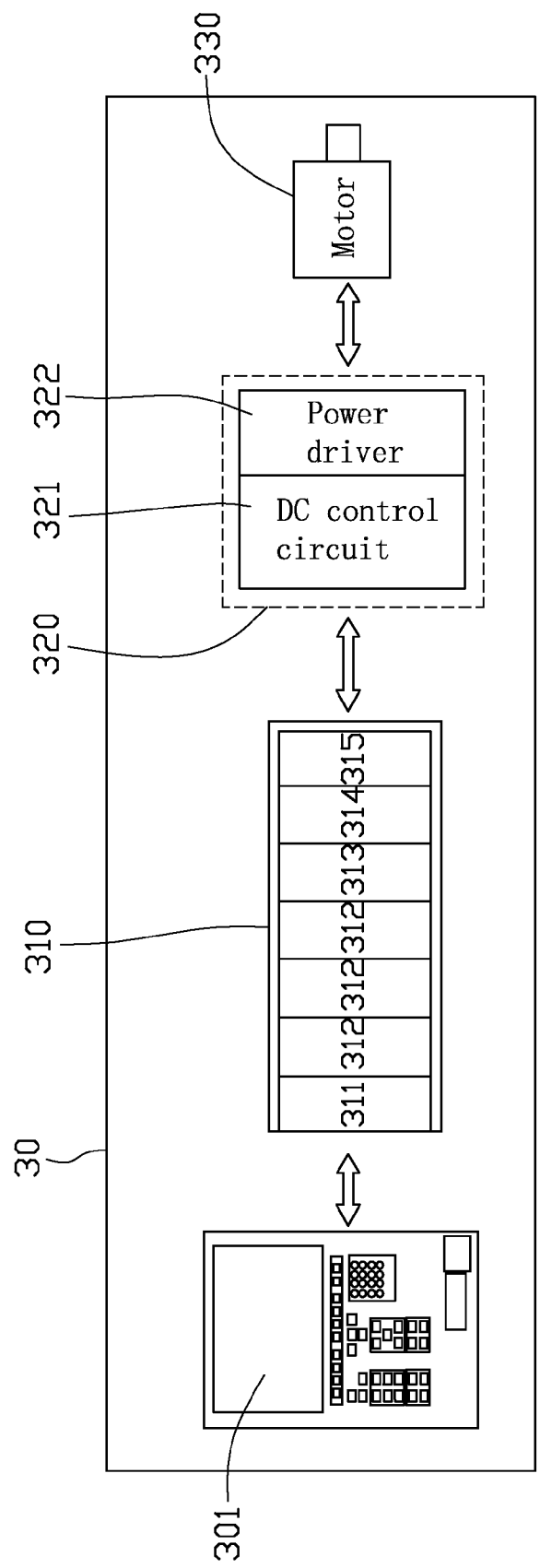
FIG. 4 is a schematic diagram of a conventional serial movement control system.

The functions of the movement cards 115 of FIG. 1 and 215 of FIG. 2, serial movement card 315 of FIG. 3, and DC control circuits 121, 221, and 321 are integrated into the servo driven control card 413 in the motor control system, so the number of control cards in the motor control system compare with the number of the control cards in the conventional movement control system is reduced. Therefore, the motor control system is simple and compatible with various communication protocols.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching. The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those of ordinary skill in the art to which the present disclosure pertains without departing from its spirit and scope. Accordingly, the scope of the present disclosure is defined by the appended claims rather than the foregoing description and the exemplary embodiments described therein.

What is claimed is:

1. A motor control system comprising:
   a man machine interface (MMI) comprising an operating system for processing graphics signals;
   a motor driver consisting of a control circuit for driving a motor; and
   an upper-controller comprising:
      a motherboard connected to the MMI and comprising a processor;
      a communication control module comprising a plurality of control cards; and
      a servo driven control card comprising a digital signal processor for receiving a signal from the communication control module and outputting a movement signal to the motor driver to drive the motor, and also receiving a motor speed signal from the motor for controlling the movement status of the motor;
   wherein in response to a control signal being inputted into the MMI and sequentially processed by the processor, the communication control module, and the servo driven control card, a driven signal is outputted from the servo driven control card to the motor driver to drive a motor.

2. The motor control system as claimed in claim 1, wherein the motherboard comprises a plurality of input and/or output interfaces for connecting to the communication control module and the servo driven control card.

3. The motor control system as claimed in claim 1, wherein the communication control module comprises an analog input and/or output control card for converting graphic data signals to analog signals, and a digital input and/or output control card for converting graphic data signals to digital signals.

4. The motor control system as claimed in claim 1, wherein the servo driven control card communicates with the motherboard via a bus.

5. The motor control system as claimed in claim 1, wherein the motor comprises a speed detector, wherein the speed detector detects speed signals of the motor and returns the speed signals to the servo driven control card.

* * * * *